US008913490B1

(12) United States Patent
Barman et al.

(10) Patent No.: US 8,913,490 B1
(45) Date of Patent: Dec. 16, 2014

(54) SELECTIVE NOTIFICATION FOR LABEL SWITCHED PATH RE-ROUTING

(71) Applicant: Juniper Networks, Inc., Sunnyvale, CA (US)

(72) Inventors: Dhiman Barman, Sunnyvale, CA (US); Jevananth Minto Jeganathan, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 174 days.

(21) Appl. No.: 13/730,770

(22) Filed: Dec. 28, 2012

(51) Int. Cl.
*H04L 12/28* (2006.01)
*H04W 40/00* (2009.01)
*H04L 12/707* (2013.01)
*H04L 12/24* (2006.01)

(52) U.S. Cl.
CPC ........... *H04L 41/0659* (2013.01); *H04W 40/00* (2013.01); *H04L 45/22* (2013.01)
USPC ............ 370/228; 370/229; 370/312; 370/218

(58) Field of Classification Search
CPC ......... H04L 45/04; H04L 45/22; H04L 45/00; H04L 45/24; H04L 45/50; H04L 2012/562
USPC ................. 370/400, 221, 230, 235, 237, 389
See application file for complete search history.

(56) References Cited

U.S. PATENT DOCUMENTS

| | | | |
|---|---|---|---|
| 6,697,329 B1 * | 2/2004 | McAllister et al. | 370/235 |
| 6,728,205 B1 * | 4/2004 | Finn et al. | 370/217 |
| 7,184,437 B1 | 2/2007 | Cole et al. | |
| 7,263,062 B2 * | 8/2007 | Chikazawa et al. | 370/224 |
| 7,366,120 B2 * | 4/2008 | Handforth et al. | 370/310 |
| 7,688,712 B2 * | 3/2010 | Glapin et al. | 370/216 |
| 7,720,061 B1 | 5/2010 | Krishnaswamy et al. | |
| 8,107,360 B2 * | 1/2012 | Patel et al. | 370/217 |
| 8,125,928 B2 * | 2/2012 | Mehta et al. | 370/254 |
| 8,289,878 B1 * | 10/2012 | Gonzalez et al. | 370/254 |
| 2003/0103455 A1 * | 6/2003 | Pinto | 370/230 |
| 2004/0085894 A1 * | 5/2004 | Wang et al. | 370/216 |

(Continued)

OTHER PUBLICATIONS

"Link aggregation and RSVP," Mailing List Archive:nsp: juniper, retrieved from http://www.gossamer-threads.com/lists/nsp/juniper/23047, accessed on Dec. 18, 2012, 7 pp.

(Continued)

*Primary Examiner* — Dang Ton
*Assistant Examiner* — Sai Aung
(74) *Attorney, Agent, or Firm* — Shumaker & Sieffert, P.A.

(57) ABSTRACT

In one example, a network device includes a hardware-based processor, and a Resource Reservation Protocol with Traffic Engineering extensions (RSVP-TE) module executing on the hardware-based processor that establishes a plurality of label switched paths (LSPs) having the network device as a common transit network device. The network device presents a plurality of options for selection, which each specify a different algorithm for selecting LSPs to evict from the link. In response to detecting an over-subscription condition on a link along the plurality of LSPs, the RSVP-TE module selects a subset of the plurality of LSPs to evict from the link, and the RSVP-TE module outputs an error message to one or more ingress network devices associated with the selected subset of LSPs without outputting an error message to the ingress network devices associated with those LSPs not selected for eviction.

30 Claims, 3 Drawing Sheets

(56) References Cited

U.S. PATENT DOCUMENTS

| | | | | |
|---|---|---|---|---|
| 2004/0165525 | A1* | 8/2004 | Burak | 370/228 |
| 2007/0280102 | A1* | 12/2007 | Vasseur et al. | 370/225 |
| 2008/0123651 | A1* | 5/2008 | Vasseur et al. | 370/392 |
| 2012/0147740 | A1* | 6/2012 | Nakash | 370/221 |

OTHER PUBLICATIONS

Awduche et al., "RSVP-TE: Extensions to RSVP for LSP Tunnels," Network Working Group, RFC 3209, Dec. 2001, 62 pp.

Kompella et al., "Link Bundling in MPLS Traffic Engineering (TE)," Network Working Group, RFC 4201, Oct. 2005, 12 pp.

de Oliveira et al., "Label Switched Path (LSP) Preemption Policies for MPLS Traffic Engineering," Network Working Group, RFC 4829, Apr. 2007, 20 pp.

Berger et al., "PathErr Message Triggered MPLS and GMPLS LSP Reroutes," Internet Engineering Task Force (IETF) RFC 5710, Jan. 2010, 13 pp.

Vasseur et al., "Node Behavior upon Originating and Receiving Resource Reservation Protocol (RSVP) Path Error Messages," Internet Engineering Task Force (IETF), RFC 5711, Jan. 2010, 8 pp.

Meyer et al., "MPLS Traffic Engineering Soft Preemption," Internet Engineering Task Force (IETF), RFC 5712, Jan. 2010, 14 pp.

U.S. Appl. No. 12/182,619, by Jerome P. Moisand, filed Jul. 30, 2008.

* cited by examiner

SELECTIVE NOTIFICATION FOR LABEL SWITCHED PATH RE-ROUTING

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). A set of packets to be forwarded along the LSP is referred to as a forwarding equivalence class (FEC). A plurality of FECs may exist for each LSP, but there may be only one active LSP for any given FEC. Typically, a FEC definition includes the IP address of the destination of the LSP, e.g., an IP address assigned to the egress router of the LSP. In general, each router along the LSP maintains a context that associates a FEC with an incoming label and an outgoing label. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR or LER. The egress LER removes the label from the packet and forwards the packet to its destination in accordance with non-label based packet forwarding techniques.

In some computer networks, MPLS traffic may be routed through an "aggregate link," which refers to a logical link representing two or more physical links. Logically, these aggregate links appear as a single interface to the network devices. For example, a bundled link may be a logical construct that represents a way to map information about certain physical resources that interconnect label switching routers with information that is used by constrained Shortest Path First (SPF) for the purpose of path computation, and by MPLS signaling. The aggregate links may also be referred to as bundled links or aggregated bundles. Example aggregate links include aggregated Ethernet links and aggregated SONET links, which may be configured and maintained using a link aggregation control protocol (LACP). Additional details of link bundling in MPLS-TE can be found in K. Kompella, "Link Bundling in MPLS-TE," Network Working Group, RFC 4201, October 2005, the entire contents of which are incorporated by reference herein.

Generally, link aggregation may improve bandwidth in comparison to that of a single link, while also providing connection redundancy. That is, aggregation of links into logical bundles may result in an available bandwidth of all of the bundled links combined. Managing the forwarding of MPLS traffic over bundled links may be problematic in some situations.

SUMMARY

In general, this disclosure describes techniques for re-routing MPLS traffic for label switched paths (LSPs) that traverse a common bundled link. The techniques may be applied, for example, by a transit network device along multiple LSPs to selectively notify ingress network devices of the LSPs to prompt one or more of the ingress network devices to re-route a subset of the LSPs. The techniques of this disclosure enable a transit router to selectively evict Traffic Engineering LSPs that traverse a shared resource, causing some of the ingress network devices to reroute some of the LSPs while leaving other LSPs in place to continue forwarding network traffic along the shared resource.

As one example, the shared resource may be a bundled link used by the transit network device to forward traffic to a downstream network device. The multiple ingress network devices may establish several Traffic Engineering (TE) LSPs that traverse the transit network device and the bundled link. In some cases, the bundled link may become oversubscribed. That is, an amount of bandwidth reserved by LSPs on the bundled link may exceed the amount of bandwidth allowed to be reserved on the bundled link selected for transport of MPLS traffic that exceeds the available bandwidth of the aggregated link. For example, if a component link or physical interface associated with the bundled link fails, this reduces the overall capacity and available bandwidth on the bundled link. Upon detecting the reduced bandwidth on the bundled link, the transit router along the path of the TE LSPs can use the techniques of this disclosure to select a subset of the LSPs to evict, and can send a notification to the appropriate ingress routers to trigger re-routing of the subset of the LSPs.

For example, the transit router may send one or more Path Error messages to the selected ingress router(s) to inform the ingress routers to re-route the appropriate LSPs. In one example aspect, the Path Error message may inform the ingress routers that the bundled link has been over-subscribed. In this way, the transmit router may avoid reroute of all the LSPs traffic engineered to traverse a common aggregate link.

In one example aspect, a method includes establishing a plurality of label switched paths (LSPs) having a common transit network device other than an ingress network device or an egress network device of any of the plurality of LSPs, and by the transit network device, presenting a plurality of options for selection, wherein each of the plurality of options specifies a different algorithm to be used by the transit network device for selecting a subset of the plurality of LSPs to evict from the link, wherein the subset comprises less than all of the plurality of LSPs, and receiving an indication of a selected one of the plurality of options. The method also includes, by the transit network device along the plurality of LSPs, detecting an over-subscription condition on a link along the plurality of LSPs and coupled to the transit network device. The method also includes, in response to detecting the over-subscription condition, and by the transit network device, applying an algorithm specified by the selected one of the plurality of options to select a subset of the plurality of LSPs to evict from the link, wherein the subset comprises less than all of the plurality of LSPs, and outputting an error message to one or more ingress network devices associated with the selected subset of the plurality of LSPs without outputting an error message to the ingress network devices associated with those of the plurality of LSPs not selected to evict from the link, wherein the error message specifies the respective selected LSP of the selected subset.

In another example aspect, a network device includes a hardware-based processor, and a Resource Reservation Protocol with Traffic Engineering extensions (RSVP-TE) module executing on the hardware-based processor, wherein the RSVP-TE module establishes a plurality of label switched paths (LSPs) having the network device as a common transit network device other than an ingress network device or an egress network device of any of the plurality of LSPs. The network device also includes a management interface that presents a plurality of options for selection, wherein each of the plurality of options specifies a different algorithm to be used by the transit network device for selecting a subset of the plurality of LSPs to evict from the link, wherein the subset comprises less than all of the plurality of LSPs, wherein the management interface receives an indication of a selected one of the plurality of option. In response to detecting an over-subscription condition on a link along the plurality of LSPs, the RSVP-TE module applies an algorithm specified by the selected one of the plurality of options to select a subset of the plurality of LSPs to evict from the link, wherein the subset comprises less than all of the plurality of LSPs, and the RSVP-TE module outputs an error message to one or more ingress network devices associated with the selected subset of the plurality of LSPs without outputting an error message to the ingress network devices associated with those of the plurality of LSPs not selected to evict from the link, wherein the error message specifies the respective selected LSP of the selected subset.

In a further example aspect, a computer-readable storage medium includes instructions for causing a programmable processor to establish a plurality of LSPs having a common transit network device, wherein the transit network device comprises a network device other than an ingress network device of any of the plurality of LSPs and wherein the transit network device comprises a network device other than an egress network device of any of the plurality of LSPs, present a plurality of options for selection, wherein each of the plurality of options specifies a different algorithm to be used by the transit network device for selecting a subset of the plurality of LSPs to evict from the link, wherein the subset comprises less than all of the plurality of LSPs, and receive an indication of a selected one of the plurality of option. The computer-readable storage medium includes instructions to detect an over-subscription condition on a link along the plurality of LSPs and coupled to the transit network device, and, in response to detecting the over-subscription condition, apply an algorithm specified by the selected one of the plurality of options to a subset of the plurality of LSPs to evict from the link, wherein the subset comprises less than all of the plurality of LSPs, and to output an error message to one or more ingress network devices associated with the selected subset of the plurality of LSPs, without outputting an error message to the ingress network devices associated with those of the plurality of LSPs that were not selected to evict from the link, wherein the error message specifies the respective selected LSP of the selected subset.

The techniques of this disclosure may provide one or more advantages. For example the techniques of this disclosure can avoid prolonged traffic loss that might otherwise occur until the ingress network devices would be able to re-route the LSPs on their own. As another example, the techniques of this disclosure can increase network utilization and avoid bandwidth wastage by preventing a situation in which each ingress network device reroutes each of the LSPs, leaving the bundled link underutilized. The techniques of this disclosure can therefore improve the usefulness of bundled links by mitigating a potential risk of deploying aggregated Ethernet or aggregated SONET links in a network.

The techniques of this disclosure can be used by network devices irrespective of whether they are configured to use LSP preemption. The ingress and transit routers do not need to be configured with LSP preemption. The techniques of this disclosure will work even if all the transit LSPs under consideration either have the same or no priorities configured. Preemption can be used as a tool by some network devices to ensure that high priority LSPs can always be routed through relatively favorable paths. The techniques of this disclosure can also provide a useful tool in situations where preemption is configured on the LSPs but there are multiple LSPs having equal priority. That is, the techniques can provide a mechanism for choosing between multiple LSPs having equal preemption priority, and evicting less than all of the multiple LSPs having equal priority. In this manner, the techniques of this disclosure are complementary to the preemption approach. In addition, the techniques of this disclosure can also be used where LSP preemption is not in use. Further details of preemption are described in J. de Oliveira, "Label Switched Path (LSP) Preemption Policies for MPLS Traffic Engineering," Network Working Group RFC 4829, April 2007, the entire contents of which are incorporated by reference herein.

The techniques of this disclosure allow the transit router to inform the respective ingress routers of an oversubscription condition, so that the ingress routers can act to reroute the LSPs if so desired in response to the notification. This allows the ingress router to reroute the LSP in a make-before-break manner. Unlike conventional preemption methods, no action is taken by the transit router in terms of sending ResvTear message or tearing down LSP sessions. In addition, the techniques of this disclosure provide more choices to an administrator for managing network bandwidth, and present a plurality of options for how the LSPs are selected to be evicted.

The details of one or more examples are set forth in the accompanying drawings and the description below. Other features, objects, and advantages will be apparent from the description and drawings, and from the claims.

DETAILED DESCRIPTION

Figure 1:
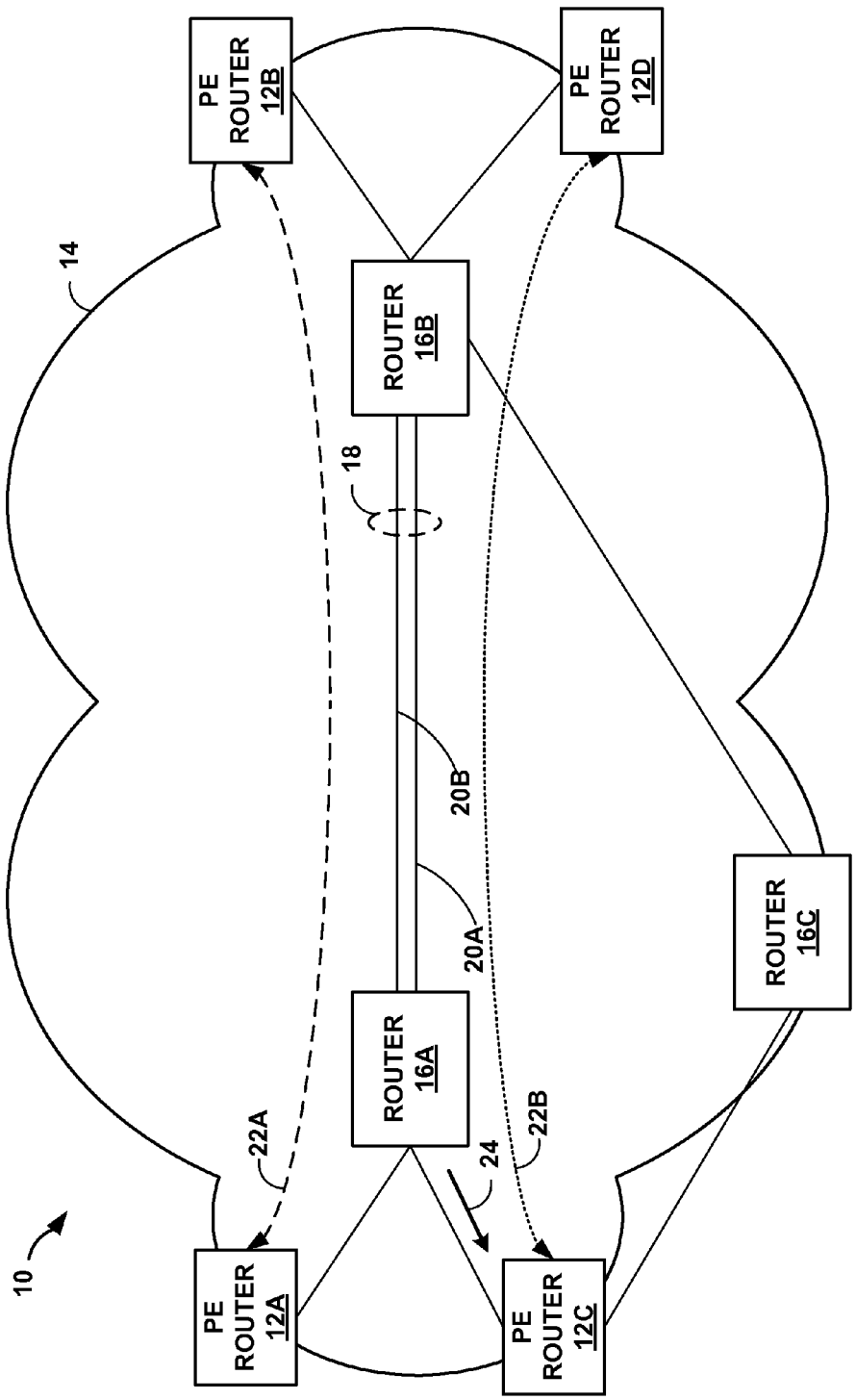
FIG. 1 is a block diagram illustrating an example system in which routers are configured to forward network traffic in accordance with the techniques of this disclosure.

FIG. 1 is a block diagram illustrating an example network system 10 in which provider edge (PE) routers 12A-12D ("PE routers 12") and router 16A-16C ("routers 16") of network 14 are configured to forward network traffic (e.g., network packets) in accordance with the techniques of this disclosure.

In some examples, network 14 may be a service provider network. For example, network 14 may represent one or more networks owned and operated by a service provider (which is commonly a private entity) that offer one or more services for consumption by subscriber networks. In this context, network 14 is typically a L3 packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

In the example of FIG. 1, router 16A is a transit router along the path of two label switched paths (LSPs) 22A and 22B ("LSPs 22"). That is, as a transit router, router 16A is an intermediate router along LSPs 22 and is neither an ingress router nor an egress router of the LSPs. In this example, PE router 12A is the ingress router of LSP 22A, and PE router 12B is the egress router of LSP 22A. PE router 12C is the ingress router of LSP 22B, and PE router 12D is the egress router of LSP 22B. Both of LSPs 22A and 22B run through transit router 16A, bundled link 18, and transit router 16B.

PE routers 12 and routers 16 represent any network device that routes or otherwise forwards traffic through network 14. Typically, routers 12, 16 represent a L3 packet-switching device that operates at L3 to receive routing information describing a current topology of network 14. Routers 12, 16 then process this routing information, selecting paths through its representation of the topology of network 14 to reach all available destinations to generate forwarding information. In other words, routers 12, 16 reduce these paths to so-called "next hops" which identify which of its interfaces traffic destined for a particular destination is to be forwarded, where the forwarding information includes this list of next hops. Routers 12, 16 then install this forwarding information in a forwarding plane of the router, whereupon the forwarding plane forwards received traffic in accordance with the forwarding information.

In the example of FIG. 1, bundled link 18 is a bundled link comprised of component links 20A-20B ("component links 20"). Although illustrated with two component links 20, in other examples bundled link 18 may include more than two component links. Bundled link 18 may be an aggregated Ethernet link, and aggregated SONET link, or other aggregated, bundled link.

Routers 12, 16 exchange RSVP-TE messages to reserve bandwidth and confirm the reservation. For example, router 16A receives RSVP-TE PATH messages from PE routers 12A and 12C for setting up LSPs 22A and 22B, respectively. In response, router 16A forwards the RSVP-TE PATH messages to router 16B, and also sends RSVP-TE RESV messages back to the ingress routers 12 confirming the reservation of the requested bandwidth. In this way, a total bandwidth provided by aggregate link 18 may be utilized by routers 12, 16 when signaling and provisioning LSPs 22A, 22B.

In some cases, bundled link 18 may become oversubscribed. That is, in some situations, bandwidth reserved for use by LSPs 22A, 22B for transport of MPLS traffic through aggregated link 18 exceeds the bandwidth currently available from the aggregated link. More specifically, an oversubscription condition can occur on a link when the combined demand of all RSVP sessions exceeds a physical capacity of the link (e.g., bundled link), or exceeds a configured amount of allowed bandwidth. Router 16A may be configured with a value that specifies a percentage of an interface (or link's) bandwidth (i.e., physical capacity of a link) that is allowed to be used for reservations. This percentage can be 100%, for example, or more or less than 100%. An allowed bandwidth of greater than 100% would mean that it is permitted to reserve bandwidth amounts greater than a physical capacity of a link (e.g., when the timing of traffic is spread out throughout the day and likely to actually exceed the capacity at any given time). In this case, an oversubscription condition would occur on the link when the combined demand of all RSVP sessions exceeds the configured amount of allowed bandwidth even though that amount of configured bandwidth may exceed the physical capacity of the link.

In one example, component links 20A and 20B may each have a bandwidth capacity of ten Gigabits per second (Gbps), giving bundled link 18 a bandwidth capacity of twenty Gigabits per second. Assume LSP 22A requires five Gigabits per second, and LSP 22B requires twelve Gigabits per second. When component link 20A fails, router 16A detects an oversubscription condition on bundled link 18, because without the capacity of component link 20A, the overall configured amount of allowed bandwidth for bundled link 18 is suddenly reduced compared to the bandwidth reserved for use by LSPs 22A, 22B. For example, router 16A may use LACP for detecting the component link failure. As another example, router 16A can use a connectivity fault detection protocol session on each component link 20 to detect when failure of the component link occurs. The connectivity fault detection protocol may be, for example, Bidirectional Forwarding Protocol (BFD), Ping, and the like. Router 16A may detect that the amount of reserved bandwidth on bundled link 18 (in this example, seventeen Gbps) exceeds the new amount of available bandwidth after the failure (ten Gbps). Unless and until at least one of LSPs 22 is rerouted, LSPs 22 may observe traffic loss.

Router 16A detects the change in available bandwidth on an interface associated with bundled link 18. In accordance with the techniques of this disclosure, in response to detecting an oversubscription condition on the bundled link 18, router 16A selects for eviction one or more LSPs that run through the bundled link 18. Router 16A can be configured to use various methods of selecting which LSPs to evict, and several examples are described below. In one example, router 16A determines that evicting LSP 22B, and leaving LSP 22A untouched, will meet the new bandwidth constraint of bundled link 18. Router 16A then sends a notification 24 to PE router 12C, the ingress router of LSP 22B. For example, the notification 24 may be a Path Error message, such as an RSVP-TE PathErr message. PathErr messages are routed hop-by-hop using the path state established when a Path message is routed through the network 14 from the ingress to egress. PathErr messages do not modify the state of any node through which the pass; they are only reported to the ingress of the TE LSP. Further information regarding PathErr messages can be found in J P. Vasseur, "Node Behavior upon Originating and Receiving Resource Reservation Protocol (RSVP) Path Error Messages," RFC 5711, January 2010, the entire contents of which are incorporated by reference herein.

In this example, router 16A does not, however, evict LSP 22A or send a notification to PE router 12A, the ingress router of LSP 22A. Instead, router 16A makes no change to LSP 22A and does not notify PE router 12A of the detected oversubscription. Router 16A allows traffic to continue to be forwarded along LSP 22A over bundled link 18. In this manner, transit router 16A selects a subset of the LSPs 22 to which to be evicted, and sends notifications 24 for only the selected LSPs. In some examples, LSP 22A and LSP 22B may be configured with equal preemption priority levels, and the techniques of this disclosure allow for selecting fewer than all of the LSPs having equal preemption priority. Alternatively, the techniques of this disclosure can also be used when preemption is not configured on the ingress and/or transit routers for the LSPs.

As one example, when LSP 22B is evicted, ingress PE router 12C receives the Path Error message 24 from transit router 16A, and selects a new path that avoids bundled link 18. For example, PE router 12C may send an RSVP-TE PathTear message to router 16A to tear down LSP 22B, and may then re-signal LSP 22B over the path from PE router 12C to router 16C to router 16B to PE router 16D by sending a new RSVP-TE Resv message along this path.

Transit router 16A sends a corresponding PathErr messages for a given RVSP signaling session and, therefore, for a given LSP, so the example of FIG. 1 only evicts LSP 22B. Thus, even if ingress router 12C had other LSPs established through router 16A and bundled link 18, ingress router 12C would not necessarily reroute those other LSPs to avoid bundled link 18 upon receiving the PathErr message.

Transit router 16A may use various techniques to notify the appropriate ingress router(s) of the recommended eviction. The ingress PE routers 12A, 12C may be configured to allow LSP preemption on LSPs 22A, 22B. For example, the ingress PE routers 12A, 12C of the LSPs 22A, 22B may, when signaling to establish the LSPs 22, explicitly signal the desire for the LSPs 22 to benefit from a soft preemption mechanism (and thus not to be hard preempted if the soft preemption mechanism is available). For example, the transit router can send the same PathErr message as used when soft preemption is configured, such as a Path Error "Reroute Request Soft Preemption" error value, as described in M. Meyer, "MPLS-TE Soft Preemption," IETF RFC 5712, January 2010, the entire contents of which are incorporated by reference herein. This may include setting a "Soft Preemption Desired bit" in the Session-Attribute Flags of the RSVP signaling messages.

Transit router 16A can determine whether preemption is configured for the LSPs based, for example, on the LSP signaling by the ingress router.

As another example, transit router 16A may inform the ingress router(s) of the LSPs to be evicted of the recommended eviction by sending a Path Error message having a newly defined error code, such as a code indicating "link oversubscription detected" as the reason for the Error message. The transit router 16A can notify the ingress routers of the recommended eviction, independent of whether preemption is configured on the ingress routers.

In this way, the techniques of this disclosure allow the transit router 16A to inform the respective ingress routers of an oversubscription condition detected on bundled link 18, so that the ingress routers 12 can act to reroute the LSPs 22 if so desired in response to the notification. This allows the ingress router to reroute the LSP in a make-before-break manner. Unlike conventional preemption methods, no action is taken by the transit router in terms of sending ResvTear message or tearing down LSP sessions. In addition, as described in further detail below, the techniques of this disclosure provide more choices to an administrator for managing network bandwidth, and present a plurality of options for how the LSPs are selected to be evicted.

Figure 2:
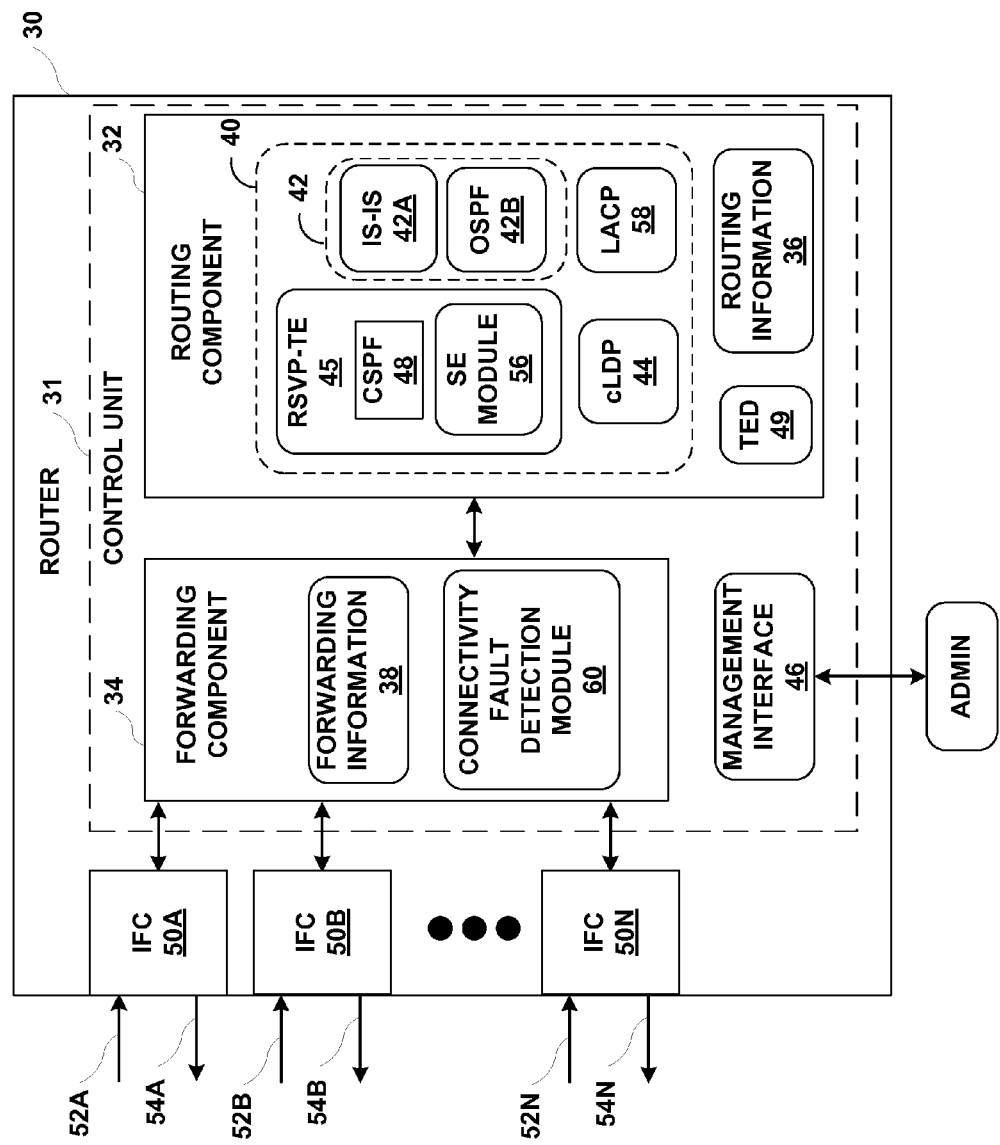
FIG. 2 is a block diagram illustrating an example embodiment of a network device in accordance with the techniques of this disclosure.

FIG. 2 is a block diagram illustrating an example an exemplary router 30 in accordance with this disclosure. Router 30 may, for example, represent any of routers 12 or 16 of FIG. 1. In this example, router 30 includes a control unit 31 that comprises a routing component 32 and a forwarding component 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which router 30 is connected. In particular, IGPs 42 update routing information 36 to accurately reflect the topology of the network and other entities. Router 30 may include other example routing protocols such as Border Gateway Protocol (BGP).

Routing component 32 generates and programs forwarding component 34 with forwarding information 38 that associates network destinations with specific next hops and corresponding interfaces ports of IFCs 50 in accordance with routing information 36. Routing component 32 may generate forwarding information 38 in the form of a radix tree having leaf nodes that represent destinations within the network, for example.

Based on forwarding information 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of router 30 can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 61 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers. As another example, constrained Label Distribution Protocol (cLDP) 44 may send and receive label mapping messages for establishing a LSP.

In addition, routing component 32 includes a link aggregation control protocol (LACP) module 58 that operates to bundle one or more of interfaces associated with links 52, 54 into a bundled link and treat the bundled link as a single logical interface in terms of forwarding. While shown as implementing LACP, control unit 31 may implement or otherwise provide an execution environment for any other type of bundled link protocol capable of establishing bundled links of logical and/or physical interfaces. LACP module 58 generally provides the abstraction to maintain aggregated bundle 18 (FIG. 1).

When operating as a transit router such as router 16A (FIG. 1), router 30 receives RSVP-TE PATH messages from PE routers 12A and 12C for setting up LSPs 22A and 22B, respectively. In response, RSVP-TE module 45 of router 30 forwards the RSVP-TE PATH messages to router 16B, and also sends RSVP-TE RESV messages back to the ingress routers confirming the reservation of the requested bandwidth. RSVP-TE module 45 may also inform IGPs 42, which in turn can update TED 49 with current available bandwidth information. IGPs 42 may also forward the updated current available bandwidth information to other IGP peers. In some cases, IGPs 42 may not perform an IGP update for small changes in bandwidth, and router 30 may be configured with a threshold bandwidth amount that IGPs 42 use to determine when to perform an IGP update. RSVP-TE module 45 may also store MPLS labels to forwarding information 38 for LSPs 22A and 22B.

Subsequent to LSPs 22A and 22B being established, router 30 as the transit router detects an oversubscription condition on a bundled link, such as aggregated bundle 18 (FIG. 1). For example, connectivity fault detection protocol module 60 may run a session on each component link of the bundled link, and can detect when one of the component links fails. In some examples, the aggregated bundle 18 is managed by the kernel of router 30, and the routing protocol daemon (RPD) and/or RSVP-TE module 45 is informed by the kernel if there is any change. RSVP-TE module 45 will react depending on its configuration. In some examples, LACP module 58 may be used to detect the component link failure, and can inform RSVP-TE module 45.

In the example of a one-hop session (IGP) at a transit router adjacent to the failed link, then a Periodic Packet Management Daemon (PPMD) (not shown) of routing component 32 may delegate connectivity fault detection functionality to a forwarding component monitor module (e.g., pfemon). Otherwise, routing component 32 will do fault detection, such as with LACP module 58.

Example techniques for connectivity fault detection in a multi-chassis routing system are described in U.S. Pat. No. 7,720,061, filed Aug. 18, 2006, entitled "Distributed Solution for Managing Periodic Communications in a Multi-Chassis Routing System," the entire contents of which are incorporated by reference herein.

In response to RSVP-TE module 45 detecting that the reserved amount of bandwidth exceeds the configured percentage of the bundled link interface's bandwidth allowed to be used for reservations, selective eviction module 56 ("SE module 56") examines the set of LSPs that are associated with the bundled link interface and selects one or more of the LSPs to evict to bring the reserved amount of bandwidth within the configured percentage of bandwidth allowed to be used for reservations. Selective eviction module 56 can use any of a plurality of different options of selecting one or more of the LSPs to evict, each option specifying a different algorithm to be used by the transit network device for selecting a subset of the plurality of LSPs to evict from the link.

Router 30 also includes management interface 46 by which an administrator ("ADMIN"), script, or network management system can configure router 30. Management interface 46 may provide user interface or other interface that presents the plurality of options for selection. For example, the management interface 46 may present as options two or more of the algorithms specified below in Examples One through Six. In some aspects, management interface 46 may present the options in a simple form, such as "optimize bandwidth usage on link", "minimize number of LSPs displaced," "minimize number of large bandwidth LSPs displaced," "select randomly," or other options from which a selection can be made. Management interface 46 may receive an indication of a selected one of the plurality of options (e.g., as selected by an administrator or network management system), and may inform selective eviction module 56 of RSVP-TE 45 of the selected option. Subsequently, in response to detecting the over-subscription condition, selection eviction module 56 can apply the algorithm specified by the selected one of the plurality of options to select which LSPs to evict from the link.

In some example algorithms, selective eviction module 56 may consider for possible eviction only those bandwidths that have non-zero reserve bandwidth, letting through all those LSPs with bandwidths that have zero bandwidth reserved.

Example One

A first example algorithm for selecting which LSPs to evict is designed to minimize the bandwidth wastage in the network. Specifically, the goal in this algorithm is to use the bundled link as efficiently as possible. Assume there are N Traffic Engineering LSPs sharing the link. The optimization can be written as:

Maximize $\Sigma_{i=0}^{N} L_i S_i$ such that $\Sigma_{i=0}^{N} L_i S_i \leq B$ $L_i \in \{0,1\}$, i=1, ..., N $S_i > 0$ (only consider non-zero bandwidth LSPs), where $L_i$ is a coefficient that is either 0 or 1, $S_i$ indicates bandwidth with which LSP i is signaled from the corresponding ingress, and where B is the amount of aggregate reservable bandwidth computed after a member link of the aggregate link fails and reduces available bandwidth. When $L_i$ is 1 this means that LSP i is allowed to stay on the link and is not selected for eviction, and when $L_i$ is 0 this means that LSP i is not allowed to stay on the link and is selected for eviction. That is, selective eviction module 56 can select one or more LSPs to evict such that a sum of the reserved bandwidth of those of the plurality of LSPs that were not selected to evict from the link is maximized, and wherein the maximized sum is less than or equal to an amount of reservable bandwidth of the link. The transit router will inform the corresponding ingress routers of the LSPs selected for eviction by sending a notification. All the LSPs for which $L_i=0$ are supposed to be evicted. For example, suppose $L_1=0.1$, and $L_2=0.2$. The algorithm then approximates these values by truncating them such that $L_1=0$, and $L_2=0$, and solves the sum. In this example, only LSPs with $S_i>0$ are candidates for eviction.

Example Two

A second example algorithm for selecting which LSPs to evict is designed to minimize the number of Traffic Engineering LSPs to be re-routed. The optimization can be written as:

Maximize $\Sigma_{i=0}^N L_i$
such that
$\Sigma_{i=0}^N L_i S_i \leq B$
$L_i \in \{0,1\}$, i=1, ..., N
$S_i > 0$ (only consider non-zero bandwidth LSPs), where $L_i$ is a coefficient that is either 0 or 1, and where $S_i$ indicates bandwidth with which LSP i is signaled from the corresponding ingress, and where B is the amount of aggregate reservable bandwidth computed after a member link of the aggregate link fails and reduces available bandwidth. Similar to the Example One, when $L_i$ is 1 this means that LSP i is allowed to stay on the link and is not selected for eviction, and when $L_i$ is 0 this means that LSP i is not allowed to stay on the link and is selected for eviction. That is, selective eviction module 56 can select one or more LSPs to evict so as to minimize a number of LSPs in the subset of the plurality of LSPs to evict from the link, wherein the sum of the reserved bandwidth for each of the plurality of LSPs that were not selected is less than or equal to an amount of reservable bandwidth of the link. The transit router will inform the corresponding ingress routers of the LSPs selected for eviction by sending a notification. All the LSPs for which $L_i=0$ are supposed to be evicted. In this example, only LSPs with $S_i>0$ are candidates for eviction.

Various greedy approaches can also be offered. A greedy approach does not have the computational cost of solving an optimization problem. Computation cost could be issue for a transit route which has limited processing power and memory. Moreover, a transit router has to keep track of a large number of LSPs.

Example Three

In this greedy approach, selective eviction module 56 of RSVP-TE 45 at the transit router will sort all the Traffic Engineering LSPs on the link at issue in a decreasing order of reserved bandwidths. Selective eviction module 56 will keep in place on the link all the largest bandwidth LSPs whose aggregate reserved bandwidth $\leq B$. That is, selective eviction module 56 can determine a set of the LSPs which of the LSPs have the largest bandwidth and for which the sum of the bandwidth of the set of the LSPs is less than or equal to an amount of reservable bandwidth of the link, and select the subset as those LSPs of the plurality of LSPs that are not members of the determined set. For the remaining LSPs, router 30 will send notifications informing their respective ingress routers of the need to reroute to avoid the link. The motivation behind this approach is that since it might be difficult to re-route large bandwidth LSPs, it is better to displace smaller bandwidth LSPs.

Example Four

In this greedy approach, selective eviction module 56 of RSVP-TE 45 at the transit router will sort all the Traffic Engineering LSPs in an increasing order of reserved bandwidths. Selective eviction module 56 will keep in place on the link all the smallest bandwidth LSPs whose aggregate reserved bandwidth $\leq B$. That is, selective eviction module 56 will determine a set of the LSPs which of the LSPs have the smallest bandwidth and for which the sum of the bandwidth of the set of the LSPs is less than or equal to an amount of reservable bandwidth of the link, and select the subset as those LSPs of the plurality of LSPs that are not members of the determined set. For the remaining LSPs, router 30 will send notifications informing their respective ingress routers of the need to reroute to avoid the link. The motivation behind this approach is that since re-routing causes network churn, it is better to cause displacement of fewer LSPs.

Example Five

In another example, the LSPs to be evicted can be selected randomly, such that the sum of the reserved bandwidth for each of the plurality of LSPs that were not selected is less than or equal to an amount of reservable bandwidth of the link. In one example of this greedy approach, selective eviction module 56 of RSVP-TE 45 at the transit router will not displace an existing Traffic Engineering LSP with $$\text{probabilty} = \frac{B}{\sum_{i=1}^N S_i},$$

where $S_i$ indicates bandwidth with which LSP i is signaled from the corresponding ingress, and where B is the amount of aggregate reservable bandwidth computed after a member link of the aggregate link fails and reduces available bandwidth. Other method may be used for randomly selecting the LSPs to be evicted such that the sum of the reserved bandwidth for each of the plurality of LSPs that were not selected is less than or equal to an amount of reservable bandwidth of the link. The motivation behind this approach is that sorting has a computation cost, so it is better to avoid sorting and instead select LSPs randomly. Moreover, randomization might reduce synchronization effects during signaling.

Example Six

In another approach, RSVP at the transit router might in one option simply displace all the existing Traffic Engineering LSPs from the link and inform all the affected ingress routers. For example, the techniques of this disclosure may provide a graceful mechanism for the transit router to automatically inform all routers to move all of the LSPs away from a link or node.

In the above examples, various tie-breaker methods may be used if the LSPs have equal priorities. For example, if all transit LSPs are equal in terms of reserved BW, priorities, and other attributes, the transit router may consider the actual usage statistics of the transit LSPs and will select LSPs for eviction according to lowest usage first policy. If stats collection is not allowed in a transit router, then the default mechanism may be to choose LSPs randomly.

Selective eviction module 56 causes RSVP-TE 45 to generate a notification to be sent to the ingress routers of each of the LSPs selected by any of the above example methods. For example, the notification may be an RSVP-TE Path Error message. For example, the Path Error message may be a standard PathErr message used for LSP soft preemption, a PathTear message for tearing down the LSP by hard preemption, or a newly defined Path Error message for indicating an oversubscription condition on the bundled link. In some examples, the Path Error message may specify the bundled link that is oversubscribed (or may specify the interface associated with the bundled link). Router 30 then outputs the Path Error message to the respective ingress routers.

After sending the notification, in the case of soft preemption, RSVP-TE module 45 may wait a time period, and if RSVP-TE module 45 does not receive a PathTear message from the ingress router to reroute the LSP so as to avoid the bundled link, RSVP-TE module 45 of router 30 will then itself send a PathTear message to tear down the LSP from the bundled link and remove the LSP from stored state. In the case of hard preemption, RSVP-TE module 45 may immediately tear down the LSP state without waiting. Further information on soft preemption and hard preemption can be found in L. Berger, "PathErr Message Triggered MPLS and GMPLS LSP Reroutes," IETF RFC 5710, January 2010, the entire contents of which are incorporated by reference herein.

In another example, router 30 may operate as an ingress router (head end) of a TE LSP. For example, router 30 may receive a notification sent by a downstream transit router of an LSP of which router 30 is the ingress. For example, the notification may be a Path Error message with a new error code that indicates an oversubscription condition on a bundled link at the transit router. RSVP-TE module 45 of router 30 may be configured to correctly interpret the new Path Error message having the error code, and can reroute the LSP indicated by the Path Error message to avoid the oversubscribed bundled link. For example, in response to receiving the Path Error message, RSVP-TE module 45 can send a Path Tear message for the LSP to be rerouted, and can remove stored state from forwarding information 38 and TED 49, and CSPF 48 computes a new path through network 14 that avoids the bundled link. RSVP-TE module 45 sends a new RSVP Path message along the computed path that avoids the link.

Figure 3:
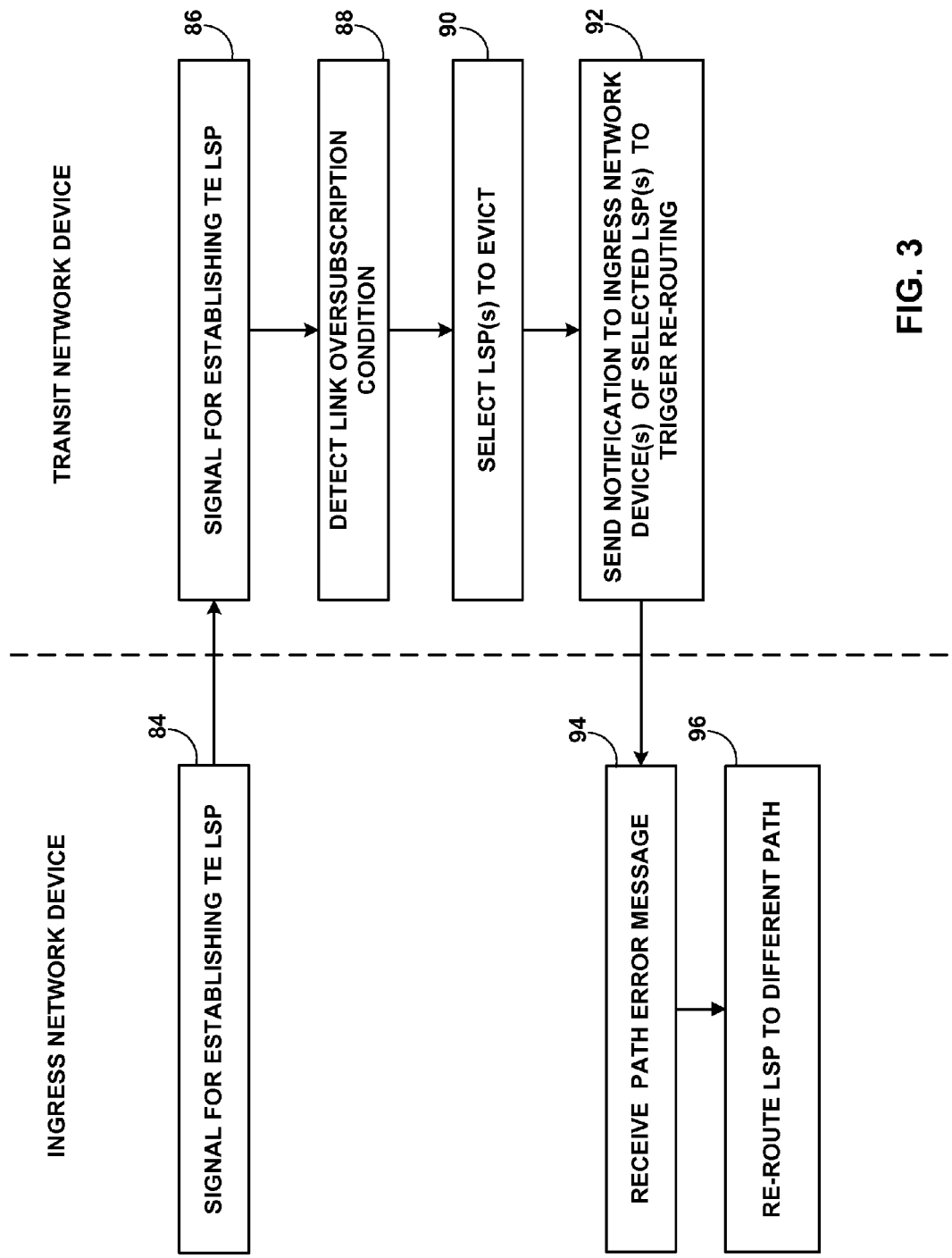
FIG. 3 is a flowchart illustrating example operation of network devices in accordance with the techniques of this disclosure.

FIG. 3 is a flowchart illustrating example operation of network devices in accordance with the techniques of this disclosure. FIG. 3 will be described with reference to FIGS. 1-2 for purposes of example. For example, FIG. 3 refers to an ingress network device and a transit network device, which in one example may be PE router 12C and transit router 16A, respectively.

The ingress network device and the transit network device signaling messages to establish a TE LSP (84, 86). PE router 12C and transit router 16A exchange RSVP-TE signaling messages to establish a TE LSP, such as LSP 22B. At the time the LSP is established, there may be multiple LSPs with multiple ingress network devices, and when established the sum of the bandwidth of all of the LSPs on the link is within the allowed amount of reserved bandwidth of the link. The link may be a bundled link. Subsequent to the LSP being established, the transit network device detects a link oversubscription condition on a link of the LSP (88). The oversubscription condition may occur due to a component link of the bundled link having failed, for example.

The transit network device then selects for eviction one or more LSPs that run through the bundled link experiencing the oversubscription condition. For example, selective eviction module 56 of router 16A may use one of the example algorithms described above for selecting LSP(s) to evict (90). In one example, router 16A selects LSP 22B for eviction from the oversubscribed link. The transit network device then sends a notification message to the ingress router to trigger rerouting of the LSP (92). For example, the notification may be a Path Error message, such as an RSVP-TE PathErr message. For example, router 16A can send Path Error message to PE router 12C, the ingress router of LSP 22B, to trigger rerouting of LSP 22B to avoid the link 18.

Ingress PE router 12C receives the Path Error message from transit router 16A (94), and in response RSVP-TE module 45 of ingress PE router 12C examines the Path Error message. The behavior at nodes receiving RSVP PathErr messages is described in J P. Vasseur, "Node Behavior upon Originating and Receiving Resource Reservation Protocol (RSVP) Path Error Messages," RFC 5711, January 2010, the entire contents of which are incorporated by reference herein. In the example of a new error code that specifies an oversubscription condition, RSVP-TE module 45 of ingress PE router 12C may determine that the Path Error message requires RSVP-TE module 45 to reroute the LSP to avoid the oversubscribed link. In response, RSVP-TE module 45 reroutes the LSP to a different path (96). For example, RSVP-TE module 45 invokes CSPF 48 to select a new path that avoids bundled link 18. PE router 12C may send an RSVP-TE PathTear message to router 16A to tear down LSP 22B, and may then re-signal LSP 22B over the path from PE router 12C to router 16C to router 16B to PE router 16D by sending a new RSVP-TE Resv message along this path.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
establishing a plurality of label switched paths (LSPs) having a common transit network device other than an ingress network device or an egress network device of any of the plurality of LSPs;
by the transit network device, presenting a plurality of options for selection, wherein each of the plurality of options specifies a different algorithm to be used by the transit network device for selecting a subset of the plurality of LSPs to evict from the link, wherein the subset comprises less than all of the plurality of LSPs;
receiving an indication of a selected one of the plurality of options;
by the transit network device along the plurality of LSPs, detecting an over-subscription condition on a link along the plurality of LSPs and coupled to the transit network device;
in response to detecting the over-subscription condition, and by the transit network device, applying an algorithm specified by the selected one of the plurality of options to select a subset of the plurality of LSPs to evict from the link, wherein the subset comprises less than all of the plurality of LSPs; and
outputting an error message to one or more ingress network devices associated with the selected subset of the plurality of LSPs without outputting an error message to the ingress network devices associated with those of the plurality of LSPs not selected to evict from the link, wherein the error message specifies the respective selected LSP of the selected subset and requests to reroute the respective selected LSP.

2. The method of claim 1, wherein the link is a bundled link composed of two or more component links, and wherein detecting the over-subscription condition comprises detecting the oversubscription condition in response to one or more of the component links becoming inoperable.

3. The method of claim 2, further comprising by the transit network device, detecting that one or more of the component links becomes inoperable using a connectivity fault detection protocol.

4. The method of claim 1, wherein outputting the error message comprises outputting an Resource Reservation Protocol with Traffic Engineering extensions (RSVP-TE) PathErr message.

5. The method of claim 4, wherein the RSVP-TE PathErr message comprises a Soft Preemption Reroute Request message that requests the ingress network device to which the message is sent to reroute the selected LSP.

6. The method of claim 4, wherein the RSVP-TE PathErr message specifies an error code that indicates a link oversubscription condition and requests the ingress network device to reroute the selected LSP to avoid the link.

7. The method of claim 1, wherein outputting the error message comprises outputting an RSVP-TE Path Tear message initiating teardown of the selected LSP, further comprising:
by the transit network device, removing forwarding state associated with the selected LSP prior to receiving a response from the associated ingress network device.

8. The method of claim 1, wherein applying an algorithm specified by the selected one of the plurality of options to select a subset of the plurality of LSPs to evict from the link comprises:
selecting one or more LSPs to evict such that a sum of the reserved bandwidth of those of the plurality of LSPs that were not selected to evict from the link is maximized, and wherein the maximized sum is less than or equal to an amount of reservable bandwidth of the link.

9. The method of claim 1, wherein applying an algorithm specified by the selected one of the plurality of options to select a subset of the plurality of LSPs to evict from the link comprises:
selecting one or more LSPs to evict so as to minimize a number of LSPs in the subset of the plurality of LSPs to evict from the link, wherein the sum of the reserved bandwidth for each of the plurality of LSPs that were not selected is less than or equal to an amount of reservable bandwidth of the link.

10. The method of claim 1, wherein applying an algorithm specified by the selected one of the plurality of options to select a subset of the plurality of LSPs to evict from the link comprises:
sorting LSPs of the plurality of LSPs on the link in decreasing order of reserved bandwidth;
determining a set of the LSPs which of the LSPs have the largest bandwidth and for which the sum of the bandwidth of the set of the LSPs is less than or equal to an amount of reservable bandwidth of the link; and
selecting the subset as those LSPs of the plurality of LSPs that are not members of the determined set.

11. The method of claim 1, wherein applying an algorithm specified by the selected one of the plurality of options to select a subset of the plurality of LSPs to evict from the link comprises:
sorting LSPs of the plurality of LSPs on the link in increasing order of reserved bandwidth;
determining a set of the LSPs which of the LSPs have the smallest bandwidth and for which the sum of the bandwidth of the set of the LSPs is less than or equal to an amount of reservable bandwidth of the link; and
selecting the subset as those LSPs of the plurality of LSPs that are not members of the determined set.

12. The method of claim 1, wherein applying an algorithm specified by the selected one of the plurality of options to select a subset of the plurality of LSPs to evict from the link comprises randomly selecting the subset of LSPs to evict, wherein the sum of the reserved bandwidth for each of the plurality of LSPs that were not selected is less than or equal to an amount of reservable bandwidth of the link.

13. The method of claim 1, further comprising:
after the selected subset of the plurality of LSPs have been rerouted to avoid the link, and by the transit network device, forwarding network traffic on the link using those of the plurality of LSPs that were not selected to evict from the link.

14. The method of claim 1, wherein the plurality of LSPs are configured to allow LSP preemption, and wherein one of the LSPs in the selected subset has the same preemption priority as one of the LSPs that was not selected to evict from the link.

15. The method of claim 1, wherein the plurality of LSPs are not configured to allow LSP preemption.

16. The method of claim 1, wherein the error message specifies the link to be avoided.

17. A network device comprising:
a hardware-based processor;
a Resource Reservation Protocol with Traffic Engineering extensions (RSVP-TE) module executing on the hardware-based processor, wherein the RSVP-TE module establishes a plurality of label switched paths (LSPs) having the network device as a common transit network device other than an ingress network device or an egress network device of any of the plurality of LSPs; and
a management interface that presents a plurality of options for selection, wherein each of the plurality of options specifies a different algorithm to be used by the transit network device for selecting a subset of the plurality of LSPs to evict from the link, wherein the subset comprises less than all of the plurality of LSPs,
wherein the management interface receives an indication of a selected one of the plurality of options,
wherein, in response to detecting an over-subscription condition on a link along the plurality of LSPs, the RSVP-TE module applies an algorithm specified by the selected one of the plurality of options to select a subset of the plurality of LSPs to evict from the link, wherein the subset comprises less than all of the plurality of LSPs, and
wherein the RSVP-TE module outputs an error message to one or more ingress network devices associated with the selected subset of the plurality of LSPs without outputting an error message to the ingress network devices associated with those of the plurality of LSPs not selected to evict from the link, wherein the error message specifies the respective selected LSP of the selected subset and requests to reroute the respective selected LSP.

18. The network device of claim 17, wherein the link is a bundled link composed of two or more component links, and wherein the RSVP-TE module detects the over-subscription condition in response to one or more of the component links becoming inoperable.

19. The network device of claim 17, wherein the error message comprises an RSVP-TE PathErr message.

20. The network device of claim 19, wherein the RSVP-TE PathErr message comprises a Soft Preemption Reroute Request message that requests the ingress network device to which the message is sent to reroute the selected LSP.

21. The network device of claim 19, wherein the RSVP-TE PathErr message specifies an error code that indicates a link oversubscription condition and requests the ingress network device to reroute the selected LSP.

22. The network device of claim 17, wherein the RSVP-TE module applies an algorithm specified by the selected one of the plurality of options to select one or more LSPs to evict such that a sum of the reserved bandwidth of those of the plurality of LSPs that were not selected to evict from the link is maximized, and wherein the maximized sum is less than or equal to an amount of reservable bandwidth of the link.

23. The network device of claim 17, wherein the RSVP-TE module applies an algorithm specified by the selected one of the plurality of options to select one or more LSPs to evict so as to minimize a number of LSPs in the subset of the plurality of LSPs to evict from the link, wherein the sum of the reserved bandwidth for each of the plurality of LSPs that were not selected is less than or equal to an amount of reservable bandwidth of the link.

24. The network device of claim 17, wherein the RSVP-TE module applies an algorithm specified by the selected one of the plurality of options to select the subset of the plurality of LSPs at least in part by sorting LSPs of the plurality of LSPs on the link in decreasing order of reserved bandwidth, determining a set of the LSPs which of the LSPs have the largest bandwidth and for which the sum of the bandwidth of the set of the LSPs is less than or equal to an amount of reservable bandwidth of the link, and selecting the subset as those LSPs of the plurality of LSPs that are not members of the determined set.

25. The network device of claim 17, wherein the RSVP-TE module applies an algorithm specified by the selected one of the plurality of options to select the subset of the plurality of LSPs at least in part by sorting LSPs of the plurality of LSPs on the link in increasing order of reserved bandwidth, determining a set of the LSPs which of the LSPs have the smallest bandwidth and for which the sum of the bandwidth of the set of the LSPs is less than or equal to an amount of reservable bandwidth of the link, and selecting the subset as those LSPs of the plurality of LSPs that are not members of the determined set.

26. The network device of claim 17, wherein the RSVP-TE module applies an algorithm specified by the selected one of the plurality of options to randomly select the subset of LSPs to evict, wherein the sum of the reserved bandwidth for each of the plurality of LSPs that were not selected is less than or equal to an amount of reservable bandwidth of the link.

27. The network device of claim 17, wherein, after the selected subset of the plurality of LSPs have been rerouted to avoid the link, the network device forwards network traffic on the link for those of the plurality of LSPs that were not selected to evict from the link.

28. The network device of claim 17, wherein the plurality of LSPs are configured to allow LSP preemption, and wherein one of the LSPs in the selected subset has the same preemption priority as one of the LSPs that was not selected to evict from the link.

29. The network device of claim 17, wherein the plurality of LSPs are not configured for LSP preemption.

30. A non-transitory computer-readable storage medium comprising instructions for causing a programmable processor to:
establish a plurality of label switched paths (LSPs) having a common transit network device, wherein the transit network device comprises a network device other than an ingress network device of any of the plurality of LSPs and wherein the transit network device comprises a network device other than an egress network device of any of the plurality of LSPs;
present a plurality of options for selection, wherein each of the plurality of options specifies a different algorithm to be used by the transit network device for selecting a subset of the plurality of LSPs to evict from the link, wherein the subset comprises less than all of the plurality of LSPs;
receive an indication of a selected one of the plurality of options;
by a transit network device along the plurality of LSPs, detect an over-subscription condition on a link along the plurality of LSPs and coupled to the transit network device;
in response to detecting the over-subscription condition, apply an algorithm specified by the selected one of the plurality of options to select a subset of the plurality of LSPs to evict from the link, wherein the subset comprises less than all of the plurality of LSPs; and output an error message to one or more ingress network devices associated with the selected subset of the plurality of LSPs, without outputting an error message to the ingress network devices associated with those of the plurality of LSPs that were not selected to evict from the link, wherein the error message specifies the respective selected LSP of the selected subset and requests to reroute the respective selected LSP.

* * * * *